(12) United States Patent
Curti et al.

(10) Patent No.: US 7,929,756 B2
(45) Date of Patent: Apr. 19, 2011

(54) METHOD FOR CLASSIFYING A DIGITAL IMAGE

(75) Inventors: Salvatore Curti, Palermo (IT);
Sebastiano Battiato, Acicatena (IT);
Emiliano Scordato, Palermo (IT);
Marcello Tortora, Palermo (IT);
Edoardo Ardizzone, Palermo (IT);
Marco La Cascia, Palermo (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 12/479,596

(22) Filed: Jun. 5, 2009

(65) Prior Publication Data

US 2010/0008568 A1  Jan. 14, 2010

Related U.S. Application Data

(63) Continuation of application No. 10/893,153, filed on Jul. 15, 2004, now abandoned.

(30) Foreign Application Priority Data

Jul. 15, 2004  (IT) .................... MI03A0014

(51) Int. Cl.
*G06K 9/00* (2006.01)
(52) U.S. Cl. ........ 382/165; 382/162; 382/164; 382/173; 382/180; 382/190; 382/195; 382/209; 382/224; 382/225
(58) Field of Classification Search ............... 382/162, 382/164, 165, 173, 180, 190, 195, 209, 224, 382/225
See application file for complete search history.

(56) References Cited

U.S. PATENT DOCUMENTS

| | | | |
|---|---|---|---|
| 5,048,095 A * | 9/1991 | Bhanu et al. .................. | 382/173 |
| 5,412,427 A | 5/1995 | Rabbani et al. | |
| 5,592,256 A | 1/1997 | Muramatsu | |
| 6,512,846 B1 | 1/2003 | Luo | |

(Continued)

OTHER PUBLICATIONS

Comaniciu, D. et al., Robust Analysis of Feature Spaces: Color Image Segmentation, IEEE Computer Society Conference on Computer Vision and Pattern Recognition, Jun. 17-19, 1997, pp. 750-755.
Szummer, M. et al., Indoor-Outdoor Image Classification, IEEE International Workshop on Content-Based Access of Image and Video Databases, Jan. 3, 1998, pp. 42-51.

(Continued)

*Primary Examiner* — Vikkram Bali
*Assistant Examiner* — Daniel Zeilberger
(74) *Attorney, Agent, or Firm* — Lisa K. Jorgenson; E. Russell Tarleton; Seed IP Law Group PLLC

(57) ABSTRACT

A method for associating with a digital image a class of a plurality of predefined classes having respective models, the method including the phases of dividing the digital image pixel by pixel into one or more regions belonging to a set of predefined regions that differ from each other on account of their type of content, the division being effected by establishing whether or not a pixel of the image belongs to a respective region on the basis of an operation of analyzing the parameters this pixel, the analysis operation being carried out by verifying that the parameters satisfy predefined conditions and/or logico-mathematical relationships of belonging to the respective region, acquiring from the digital image divided into regions information regarding the regions that are present in it, comparing this information with at least one model characterizing a respective class of said plurality, and associating with the digital image a class on the basis of the comparison phase.

30 Claims, 6 Drawing Sheets

U.S. PATENT DOCUMENTS

| | | |
|---|---|---|
| 6,549,660 B1 | 4/2003 | Lipson et al. |
| 7,171,042 B2 | 1/2007 | Hartmann et al. |
| 7,239,746 B1 | 7/2007 | Sinclair et al. |
| 2002/0122596 A1 | 9/2002 | Bradshaw |
| 2002/0181785 A1 | 12/2002 | Gutta et al. |
| 2003/0053686 A1 | 3/2003 | Luo et al. |
| 2005/0125368 A1* | 6/2005 | Akahori .......................... 706/12 |

OTHER PUBLICATIONS

Comaniciu, D. et al., Mean Shift Analysis and Applications, The Proceedings of the Seventh IEEE International Conference on Computer Vision, Sep. 20-27, 1999, pp. 1197-1203, vol. 2.

* cited by examiner

METHOD FOR CLASSIFYING A DIGITAL IMAGE

BACKGROUND OF THE INVENTION

1. Field of the Invention

The present invention relates to the processing of digital images and, more particularly, to a method for classifying a digital image.

2. Description of the Related Art

Digital images are currently used in numerous applications, for example in new generation acquisition devices such as photo cameras and digital still cameras (DSC). Moreover, digital images are being ever more extensively employed in applications in the field of artificial vision and in applications in the field of medical diagnostics.

In these and other contexts image classification plays a fundamental role as integrating part of the processing procedures, because it makes it possible not only to select the most appropriate algorithms on the basis of the type of image that has to be processed, but also to render the processing procedures independent of interaction with the user.

In the field of artificial vision, for example, some techniques for converting two-dimensional images into three-dimensional images are sensitively bound up with the type of image to be converted.

In some of these conversion techniques, in particular, there is typically generated a depth map relating to the 2D image to be converted, and on the basis of this map there is subsequently created a stereoscopic pair necessary for the reconstruction of the 3D output image. In the generation of this depth map the classification of the images acts as a "guide" element within the system, because it makes it possible to select and therefore utilize the most appropriate techniques on the basis of the image that is to be processed.

Image classification also plays a very important part in the processing procedures performed within the digital image acquisition devices. In this context the classification is utilized, for example, to optimize the processing as regards improvement of the quality of an acquired digital image or to optimize the compression-encoding operations.

Though widely used, the known classification techniques are associated with limits both as regards the precision of the results and from the point of view of computational complexity.

BRIEF SUMMARY OF THE INVENTION

The disclosed embodiments of the present invention therefore provide a robust classification method that will be capable of providing better performance as compared to the methods of the known techniques.

In accordance with one embodiment of the invention, a method for associating with a digital image a class of a plurality of predefined classes having respective models is provided. The method includes the phases of dividing the digital image pixel by pixel into one or more regions belonging to a set of predefined regions that differ from each other on account of their type of content, the division being effected by establishing whether or not a pixel of the image belongs to a respective region on the basis of an operation of analyzing the parameters this pixel, the analysis operation being carried out by verifying that the parameters satisfy predefined conditions and/or logico-mathematical relationships of belonging to the respective region; acquiring from the digital image divided into regions information regarding the regions that are present in it; and comparing this information with at least one model characterizing a respective class of the plurality of classes, and associating with the digital image a class on the basis of the comparison phase.

In accordance with another embodiment of the invention, a method for classifying a digital image in a class from a plurality of classes, each class having a respective model associated therewith, is provided. The method includes analyzing a digital image pixel by pixel to determine parameters of each pixel by verifying that each parameter satisfies at least one of pre-established conditions, logico-mathematical relationships, or both pre-established conditions and logico-mathematical relationships that are associated with respective predefined regions, and dividing the pixels into one or more regions based on the analysis; acquiring from the digital image information relating to the regions found in the digital image; comparing the acquired information with at least one model; and associating with the digital image a class on the basis of the comparison.

In accordance with yet another embodiment of the invention, the method includes the phases of receiving an input image in CFA format and performing a chromatic reconstruction on the input image to provide an output image; segmenting the output image by dividing the output image into one or more areas that are chromatically substantially homogeneous and comprising a reduced range of colors as compared with the output image to form an output digital image; dividing the digital image pixel by pixel into one or more regions by analyzing the image pixel by pixel to determine parameters of each pixel and verifying that each parameter satisfies at least one of pre-established conditions, logico-mathematical relationships, or both pre-established conditions and logico-mathematical relationships that are associated with respective predefined regions; acquiring from the digital image information relating to the regions found in the digital image; comparing the acquired information with at least one model; and associating with the digital image a class on the basis of the comparison.

In accordance with still yet a further embodiment of the invention, a method for classifying a digital image in a class from a plurality of classes is provided, each class having a respective model associated therewith. The method includes the steps of receiving an input image in CFA format and performing a chromatic reconstruction on the input image to provide an output image; segmenting the output image by dividing the output image into one or more areas that are chromatically substantially homogeneous and comprising a reduced range of colors as compared with the output image to form an output digital image; dividing the digital image pixel by pixel into one or more regions belonging to a set of regions that are predefined and different from each other on the basis of their type of content by: application of a median filter to the digital image to obtain a filtered digital image; extraction of the digital values associated with RGB and HSI components of the filtered digital image; assignment to each pixel of the filtered digital image of a respective gray level for obtaining a provisional gray-level image divided into regions; and application of a median filter to the provisional gray-level image for obtaining a final image divided into gray-level regions; acquiring from the digital image information relating to the regions found in the digital image; comparing the acquired information with at least one model; and associating with the digital image a class on the basis of the comparison.

BRIEF DESCRIPTION OF THE SEVERAL VIEWS OF THE DRAWINGS

Further characteristics and advantages of the invention will be more readily understood from the following detailed description of its preferred embodiments, which is given by way of example and is not be understood as limitative in any way, of which.

DETAILED DESCRIPTION OF THE INVENTION

Figures 1, 2:
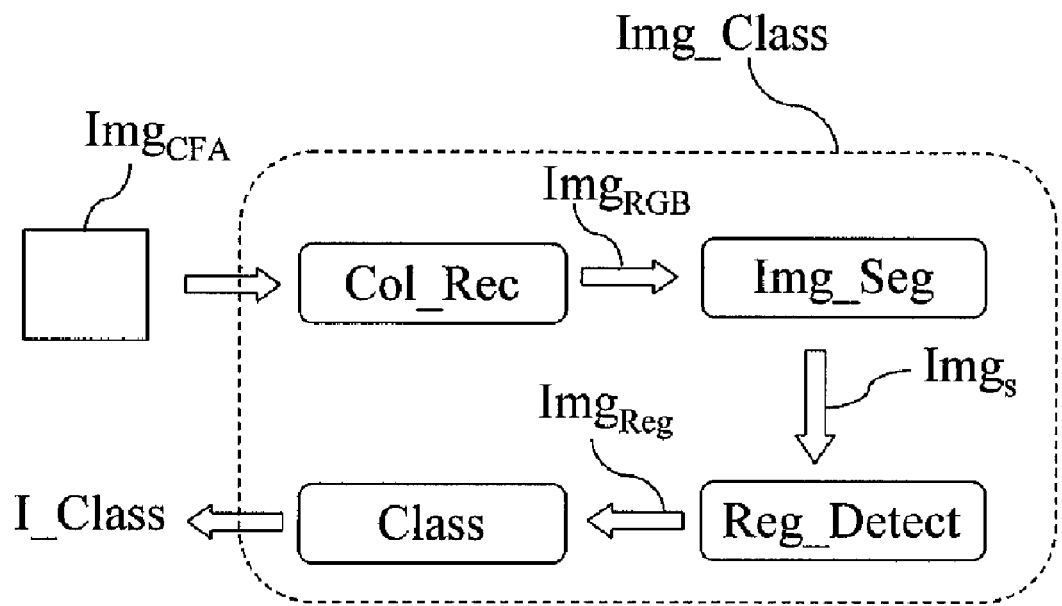
FIG. 1 schematically shows a block diagram relating to a classification method in accordance with the present invention.
FIG. 2 shows the pattern in which the filter elements are arranged in a sensor with an optical Bayer filter.

FIG. 1 schematically represents a block diagram of a classification method Img_Class in accordance with a preferred embodiment of the present invention As shown in FIG. 1, the classification method Img_Class preferably comprises a color reconstruction block Col_Rec, a segmentation block Img_Seg, a block Reg_Detect for dividing the image into regions, and a class decision block class. Ideally, the method is implemented in a computer system, such as a digital processing system for processing a computer program configured to carry out the method of the invention.

The color reconstruction block Col_Rec is adapted to carry out a processing phase of chromatic reconstruction, by means of which, starting from a digital input image Img$_{CFA}$ in CFA (Color Filter Array) format, i.e. including pixels that are each associated with a respective digital value (represented, for example, by 8 bits), one obtains a complete digital output image $I_{RGB}$, i.e. including pixels that are each associated with a respective triad of digital values.

The input digital image Img$_{CFA}$ of the color reconstruction block Col_Rec is preferably a digital image acquired with a sensor of the CCD (Charge Coupled Device) or CMOS (Complementary Metal Oxide Semiconductor) type comprising an optical CFA filter, a Bayer matrix filter for example.

As is well known to persons skilled in the art, only a single photosensitive cell is available in a sensor with a CFA filter for acquiring a pixel of the image. The sensor is covered by an optical filter comprising a matrix (a Bayer matrix, for example) of filter elements, each of which is associated with a photosensitive cell. Each filter element transmits to the photoelectric cell associated with it light radiation corresponding to the wavelength of only red light, only green light or only blue light (absorbing only a minimal part of it) and thus reveals only one component of each pixel.

The layout pattern BP of the filter elements in a Bayer filter is represented in FIG. 2, where R, G and B indicate, respectively, the red, green and blue filter elements.

The chromatic reconstruction phase is then used to recover at least partially the chromatic information present in the real scene. Preferably, the output image Img$_{RGB}$ of the reconstruction block is a digital image in RGB (Red Green Blue) format, i.e. an image in which three digital values corresponding, respectively, to the chromatic components R (Red), G (Green) and B (Blue) are associated with each pixel.

In the chromatic reconstruction phase in order to obtain an output image Img$_{RGB}$ in RGB format from an input image Img$_{CFA}$ in Bayer CFA format there is carried out a color interpolation operation that is known to persons skilled in the art and will not therefore be further described.

In a particularly advantageous variant embodiment, the chromatic reconstruction phase comprises an operation of sub-sampling the input image Img$_{CFA}$ in CFA format.

Preferably, in the sub-sampling operation the digital input image Img$_{CFA}$ is segmented into small adjacent and not overlapping blocks of pixels, for example into blocks of size 2×2. Starting from each of these small blocks, there is generated a respective colored pixel in the output image Img$_{RGB}$ in RGB format, of which the R and B components correspond to the digital values of the pixels on the secondary diagonal of the block and of which the G component is equal to the mean of the digital values of the pixels on the principal diagonal of the block.

In this way, starting from each block of size 2×2 of the input image Img$_{CFA}$ in Bayer CFA format, the color reconstruction phase produces a single pixel of the output image Img$_{RGB}$ in RGB format.

The resolution of the output image is therefore reduced with respect to the resolution of the input image. In this specific example it is equal to a quarter of the resolution of the input image.

Referring to the block pattern represented in FIG. 1, the segmentation block Img_Seg that receives the input image Img$_{RGB}$ is adapted to produce a segmented output image Img$_s$, i.e. divided into areas that are substantially homogeneous from the point of view of chromatic appearance.

In greater detail, in the segmentation block Img_Seg there is carried out a processing phase that makes it possible to identify the significant chromatic characteristics present in an image. Preferably, this processing phase is such as to operate in accordance with a technique known by the name of "mean shift algorithm," a simple and non-parametric procedure for estimating the density gradients. Advantageously, this technique is found to be particularly efficient from the computational point of view. Nevertheless, other types of segmentation may also be utilized.

The mean shift algorithm technique is described, for example, in the document: "Robust Analysis of Feature Spaces: Color Image Segmentation" (D. Comaniciu, P. Meer, Department of Electrical and Computer Engineering, Rutgers University, Piscataway, U.S.A.).

In accordance with this technique, the processing phase carried out in the segmentation block Img_Seg preferably includes a preliminary phase of transforming the digital values of the pixels of the image in RGB format from the chromatic RGB space to the Luv space.

The passage from the RGB space to the Luv space calls for a non-linear transformation.

As explained in the aforementioned article by Comaniciu and Meer, this transformation operation makes it possible for the processing operations carried out in the segmentation block to operate advantageously on a sufficiently isotropic space of the components.

The processing phase carried out in the segmentation block Img_Seg also includes a successive operation of grouping the pixels in an area on the basis of their resemblance, that is to say, the homogeneity of the pixels transformed in this manner.

Lastly, a successive operation included in the processing phase is such as to modify the pixels belonging to one and the same area in such a manner as to associate with them digital values that are substantially representative of the predominant colors of the area, thereby obtaining a segmented image $Img_S$ that, as compared with the image $Img_{RGB}$ present at the input of the segmentation block Img_Seg, comprises a reduced range of colors.

Referring to the aforementioned publication by Comaniciu and Meer, the processing phase performed in the segmentation block Img_Seg operates in accordance with the mean shift algorithm technique having a low segmentation resolution (under-segmentation).

According to this technique, the pixels are grouped together in areas by means of homogeneity criteria having an ample margin of tolerance and thus obtaining a segmented image in which the pixels have associated with them only the most significant (i.e. predominant) colors present in the input image $Img_{RGB}$ of the segmentation block.

It should be borne in mind that the number of colors present in a generic image depends on the quantity of detail present and is typically comprised between 35,000 and 40,000.

In a particularly preferred embodiment the segmentation block Img_Seg produces an output image $Img_S$ in RGB format comprising at the most about ten colors and is therefore more homogeneous and compact than the input image $Img_{RGB}$.

Figure 3A:
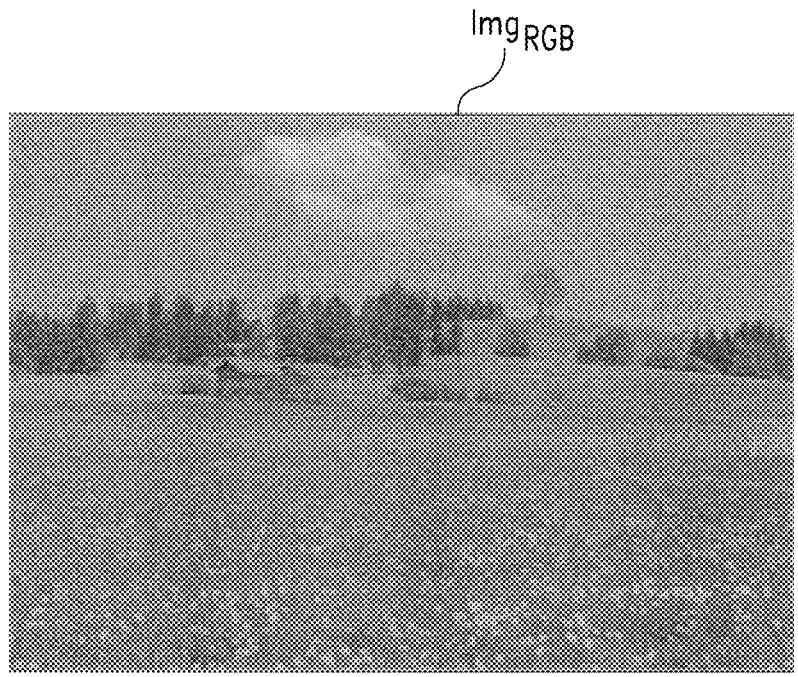
FIGS. 3A and 3B show an input image of the segmentation block Img_Seg and a corresponding segmented image produced as output from that block.
Figure 3B:
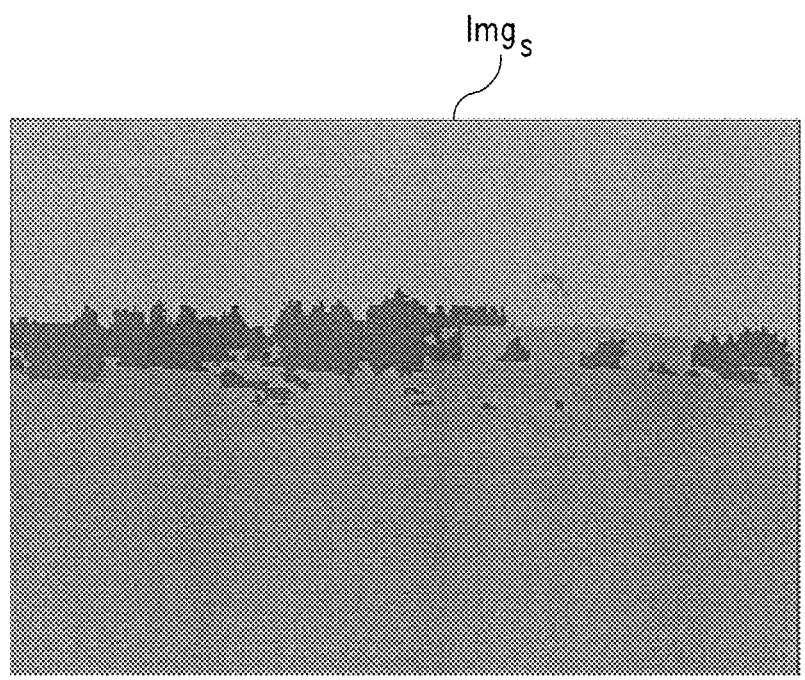

In FIG. 3 $Img_{RGB}$ is used to indicate an input image of the segmentation block Img_Seg, while $Img_S$ indicates a corresponding segmented output image produced by means of an under-segmentation processing phase. Although the images in FIGS. 3A and 3B are represented in gray scale, one can nevertheless observe the effect of the color reduction from the input image (in this example with 37,656 colors) to the output image (in this example with 4 colors).

Advantageously, it has been found that the segmentation, and particularly the "under-segmentation," makes it possible to simplify the work of the subsequent block and, more particularly, makes it possible to reduce the computational cost and at the same time to increase the robustness of the classification method in accordance with the present invention.

Coming back to the block diagram shown in FIG. 1, the region detection block Reg_Detect receives the segmented input image $Img_S$ and carries out a division phase that makes it possible to divide this image, pixel by pixel, into one or more regions forming part of a set of predefined regions that differ from each other on the basis of the type of content, producing an output image $Img_{Reg}$ divided into one or more regions.

Preferably, the predefined set of regions comprises regions of different typologies that differ from each other on account of the type of content and are identified as: "Sky," "Farthest mountain," "Far mountain," "Near mountain," "Land" and "Other." Nevertheless, regions of different types can also be taken into consideration.

It should be noted that the regions listed above are typically present in panoramic images, landscapes or, in any case, outdoor photographs.

In a particularly preferred embodiment, the division into regions is effected by establishing whether or not a pixel of the digital image belongs to a respective region on the basis of an operation analyzing the parameters of that pixel. The analysis operation is carried out by verifying whether one or more parameters of the pixel satisfy predetermined conditions or logico-mathematical relationships or both that characterize membership of the respective region. The conditions and the logico-mathematical conditions that characterize membership of a predefined region are derived empirically from a statistical observation of images that depict real scenes.

Preferably, the analyzed parameters will correspond to digital values representative of at least one of the following components of the pixel: red chromatic component, green chromatic component, blue chromatic component, hue and intensity. Other parameters similar to those just cited may however be analyzed.

After the analysis operation, the division phase also includes an operation of assigning to the analyzed pixel, i.e. associating it with a data item that identifies the respective region to which it belongs.

In an advantageous embodiment, the identification data item comprises a digital value, in practice a gray level.

For example, with pixels belonging to predefined regions that on the basis of their content can be considered to be nearer to an observation point of the image there are associated respective darker gray levels than those of pixels belonging to more distant regions. Obviously, a choice of the opposite type is wholly equivalent.

It should be noted that the set of digital values determined by the operation of assigning a digital value to the pixels of the digital image to be divided corresponds to a gray-level digital image divided into regions.

In a particular example, on the assumption that the pixels comprise 8-bit digital values, the digital values (i.e. the gray levels) to be assigned to the pixels on the basis of the region to which they belong are, for example, as shown in the following table:

| REGION | VALUE |
| --- | --- |
| Sky | 0 |
| Farthest mountain | 50 |
| Far mountain | 80 |
| Near mountain | 100 |
| Land | 200 |
| Other | 255 |

In a particularly preferred embodiment, the division into regions is effected by analyzing the image pixel by pixel. For every pixel of the segmented image there are extracted the values of the components R, G, B and the components H (Hue) and I (Intensity) and on the basis of these values it is decided whether or not a pixel belongs to one of the regions listed above is then established on the basis of these values.

The characterization of the regions is effected by means of heuristic rules and, more particularly, by conditioning rules. The conditions are represented by intervals and logico-mathematical relationships between the values R, G, B, H and I, while the corresponding actions are represented by the association with the analyzed pixels of a gray-level value.

In a particularly preferred embodiment, the phase of dividing the segmented image performed in the division block Reg_Detect comprises the operations of:

application of a median filter, preferably 5×5, to the segmented image $Img_S$ for obtaining a filtered segmented image $F\_Img_S$;

extraction of the digital values associated with the components RGB and HSI of the filtered segmented image $F\_Img_S$;

association with each pixel of the filtered segmented image $F\_Img_S$ of a gray level; associating a gray level to each pixel of the segmented image one obtains in practice a gray-level image $temp\_Img_{Reg}$;

application of a median filter, preferably 5×5, to the gray-level image $temp\_Img_{Reg}$ to obtain a final gray-level image $Img_{Reg}$.

Advantageously, the use of median filters makes it possible to reduce the noise component present in both the input image and the output image of the block for the division into regions.

Figure 4:
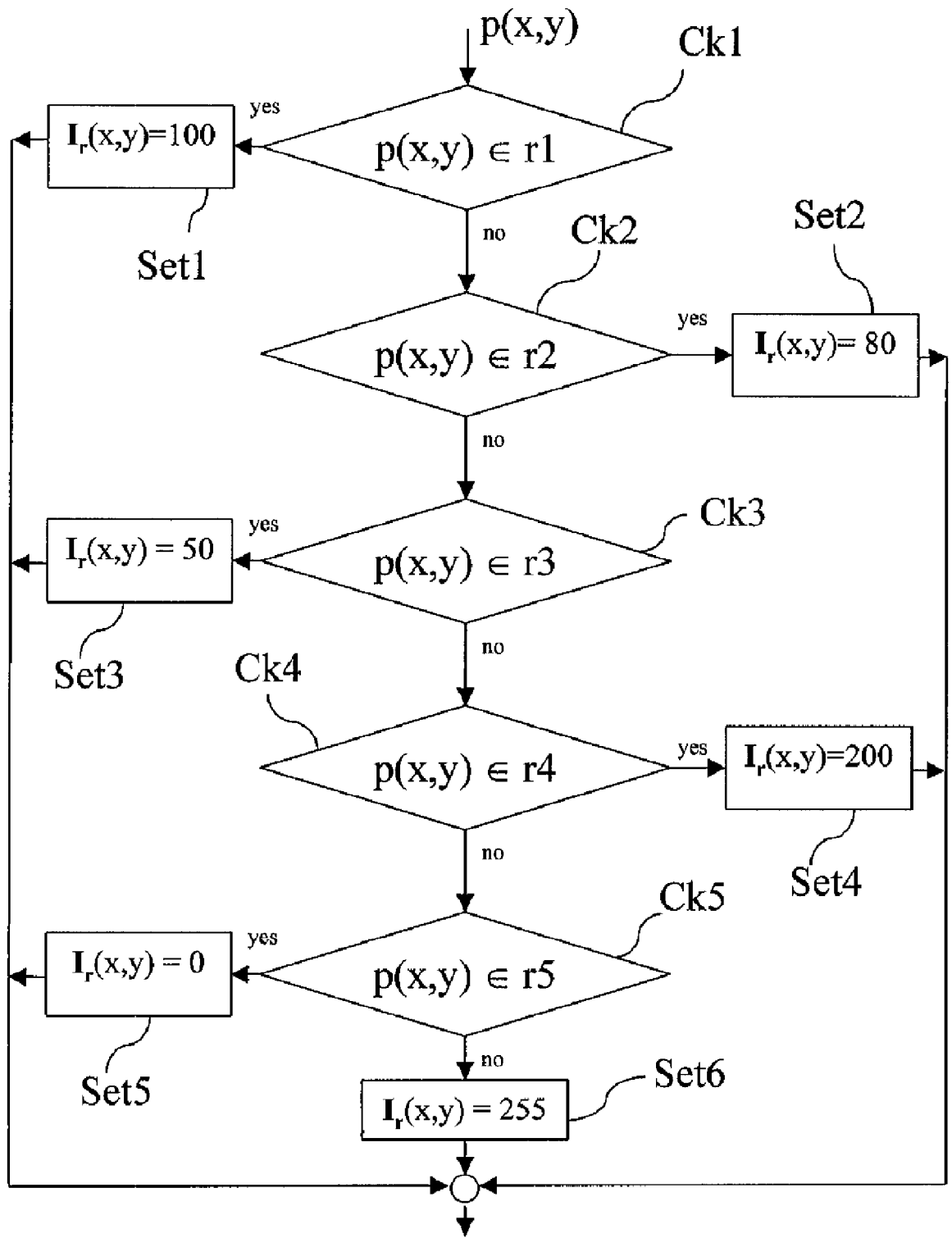
FIG. 4 shows the simplified flow chart of a preferred embodiment of the operation of assigning a gray level $I_r(x,y)$ to a pixel p(x,y) of the segmented and filtered image F_Img$_s$.

FIG. 4 shows the flow chart of a preferred embodiment of the operation of assigning a gray-level $I_r(x,y)$ to a pixel $p(x,y)$ of the filtered segmented image $F\_Img_S$ to obtain a corresponding pixel $I_r(x,y)$ of the gray-level image $temp\_Img_{Reg}$.

A check is carried out in a first control phase Ck1 for establishing whether or not the pixel p(x,y) belongs to a region of the type "Near mountain" indicated in the figure by the reference "r1."

If on the basis of this check the pixel p(x,y) is found to belong to this region, a first phase of association Set1 assigns a gray level having a digital value equal to 100 to the pixel $I_r(x,y)$ of the gray-level image $temp\_Img_{Reg}$. In that case the association operation terminates and a new pixel is taken into consideration. Otherwise, a second control phase Ck2 is carried out to establish whether or not the pixel p(x,y) belongs to a region of the type "Far mountain," indicated in the figure by the reference "r2."

If on the basis of this check the pixel p(x,y) is found to belong to this region, a second phase of association Set2 assigns a gray level having a digital value equal to 80 to the pixel $I_r(x,y)$ of the gray-level image $temp\_Img_{Reg}$. In that case the association operation terminates and a new pixel is taken into consideration.

Otherwise, a third control phase Ck3 is carried out for establishing whether or not the pixel p(x,y) belongs to a region of the type "Far mountain," indicated in the figure by the reference "r3."

If on the basis of this check the pixel p(x,y) is found to belong to this region, a third phase of association Set3 assigns a gray level having a digital value equal to 50 to the pixel $I_r(x,y)$ of the gray-level image $temp\_Img_{Reg}$. In that case the association operation terminates and a new pixel is taken into consideration.

In a preferred embodiment the conditions that make it possible to establish whether or not the pixel p(x,y) belongs to a region of the type "Near mountain" ("r1") are expressed by the following Boolean condition:

$$B(x, y) \geq G(x, y) \text{ AND } I(x, y) \leq (\text{mean\_I} - 15)$$
$$\text{AND } B(x, y) \leq (G(x, y) + 50) \text{ AND } I(x, y) \leq 90$$

$$\text{with mean\_I} = \left(\sum_{y=0}^{9}\sum_{x=0}^{W-1} C_{xy} I(x,y)\right) \bigg/ \sum_{y=0}^{9}\sum_{x=0}^{W-1} C_{xy}$$

$$\begin{cases} C_{xy} = 0 & \text{when } B(x, y) < G(x, y) \\ C_{xy} = 1 & \text{when } B(x, y) \geq G(x, y). \end{cases}$$

Likewise in a preferred embodiment, the conditions that make it possible to establish whether or not the pixel p(x,y) belongs to a region of the type "Far mountain" ("r2") are expressed by the following Boolean condition:

$B(x,y) \geq G(x,y)$ AND $I(x,y) \leq (\text{mean\_I}-15)$ AND
$B(x,y) \leq (G(x,y)+50)$ AND $I(x,y) \leq 130$.

While the conditions for establishing whether or not the pixel p(x,y) belongs to a region of the type "Farthest mountain" ("r3") are expressed by the following Boolean condition:

$B(x,y) \geq G(x,y)$ AND $I(x,y) \leq (\text{mean\_I}-15)$ AND
$B(x,y) \leq (G(x,y)+50)$ AND $I(x,y) > 130$.

In general, the condition that is common to the greater part of the pixels that represent mountains is the one of having the component B greater than the component G, but limited by G+50.

The quantity mean_I constitutes an estimate of the mean value of the luminous intensity of the pixels that should belong to a region of the type "Sky." It is calculated as the mean of the luminous intensity of the pixels of the first ten rows of the image having the component B greater than the component G. The check of the value of the intensity I with respect to mean_I-15 makes it possible to avoid pixels belonging to a region of the type "Sky" being mistaken for a pixel of a region of the type "Mountain."

In particular, the differentiation between the three types of "Mountain" is effected by exploiting the concept of atmospheric perspective introduced for the first time by Leonardo in the famous painting of the Mona Lisa. In fact, he had noted that the most distant mountains, given that they had the same chromatic hue as their nearest counterparts, appeared to be clearer (and therefore had a greater luminous intensity). This phenomenon can be explained by considering that the quantity of atmospheric dust that becomes interposed between an observer and an object increases with the distance of the object from the observer.

In this manner the more distant objects have colors nearer to white and therefore have a luminous intensity value greater than the nearer objects.

The "Farthest mountain" region is therefore characterized by a luminous intensity value I greater than 130, "Far mountain" has a luminous intensity value I comprised between 90 and 130, while "Near mountain" representing the nearest mountain is characterized by a luminous intensity value I of less than 90.

Coming back to the flow chart of FIG. 4, if on the basis of the checks carried out in the phases Ck1, Ck2 and Ck3 the pixel p(x,y) is found not to belong to one of the regions of the "Mountain" type, a fourth control phase Ck4 is undertaken to ascertain whether or not the pixel p(x,y) belongs to a region of the "Land" type indicated in the figure by the reference "r4."

If on the basis of this check the pixel p(x,y) is found to belong to this region, a fourth phase of association Set4 assigns a gray level having a digital value equal to 200 to the pixel $I_r(x,y)$ of the gray-level image $temp\_Img_{Reg}$. In that case the association operation terminates and a new pixel is taken into consideration.

In a preferred embodiment the conditions for checking whether or not the pixel p(x,y) belongs to a region of the "Land" type ("r4") are expressed by the following Boolean conditions:

$|R(x,y)-G(x,y)| \leq 10$ AND $R(x,y) \geq (B(x,y)+55)$ $|R(x,y)-G(x,y)| \leq 30$ AND $|R(x,y)-B(x,y)| \leq 30$ AND
$40 \leq I(x,y) \leq 80$ $R(x,y) \geq (B(x,y)+45)$ AND $R(x,y) \geq G(x,y)$ $R(x,y) \geq G(x,y)$ AND $G(x,y) \geq B(x,y)$ AND
$25 \leq H(x,y) \leq 50$ $G(x,y) \geq (R(x,y)+10) G(x,y) \geq (B(x,y)+15)$ AND
$I(x,y) \geq 75$ $|R(x,y)-G(x,y)| \leq 12$ AND $G(x,y) > B(x,y)$ AND
$R(x,y) > B(x,y)$.

The pixel is deemed to belong to a region of the "Land" type if one of the aforesaid conditions is found to be satisfied.

These conditions describe the family of lands that can be present in an image of the "landscape type." The first condition describes the colors typical of a beach. The next three conditions represent colors of lands with chromatic gradations tending towards dark brown and red. The penultimate condition describes the colors typical of green meadows characterized by having the component G greater than the others and a rather high luminous intensity (greater than 75). The last condition has been inserted to represent the cultivated fields (wheat fields, for example).

If none of the aforementioned six conditions is satisfied, a fifth control phase Ck5 is carried to ascertain whether or not the pixel p(x,y) belongs to a region of the "Sky" type indicated in the figure by the reference "r5."

If on the basis of this check the pixel p(x,y) is found to belong to this region r5, a fifth phase of association Set5 assigns a gray level having a digital value equal to 0 to the pixel $I_r(x,y)$ of the gray-level image temp_$Img_{Reg}$. In that case the association operation terminates and a new pixel is taken into consideration.

In a preferred embodiment the conditions for checking whether or not the pixel p(x,y) belongs to a region of the "Sky" type ("r5") are expressed by the following Boolean conditions:

$B(x,y) \geq (G(x,y)+30)$ AND $G(x,y) \geq R(x,y)$ $B(x,y) \geq G(x,y)$ AND $G(x,y) \geq R(x,y)$ $B(x,y) \geq R(x,y)$ AND $R(x,y) \geq G(x,y)$ $I(x,y) \geq 200$ AND $|B(x,y)-G(x,y)| \leq 30$ AND $|R(x,y)-G(x,y)| \leq 30$ The pixel is deemed to belong to a region of the "Sky" type if one of the aforesaid four conditions is found to be satisfied.

The first three conditions represent three variations of blue skies in which the predominant component is B(x,y). They describe the most common types of sky. The last condition represents a range of cloudy skies characterized by a gray color. Given the nature of the chromatic gradations of gray, there is no need for the presence of a component greater than the others. Furthermore, there is present a check of the value I to avoid that pixels that really belong to one of the regions of the "Mountain" type are labeled as "Sky."

The choice of the threshold value equal to 200 derives from the observation of the value I of cloudy skies present in the images. In fact, they are characterized by being particularly luminous. If none of the aforesaid four conditions is satisfied, the pixel p(x,y) is automatically assigned to a region of the "Other" type and a sixth phase of association Set6 assigns a gray level having a digital value equal to 255 to the pixel $I_r(x,y)$ of the gray-level image temp_$Img_{Reg}$; the association operation then terminates and a new pixel is taken into consideration.

As can be noted, the conditions for belonging to the regions can be briefly summarized as follows:

conditions whether or not the parameters of the pixel belong to a given interval, or mathematical relationships between parameters of one and the same pixel, or any combination of the aforementioned conditions and combinations.

Figure 5A:
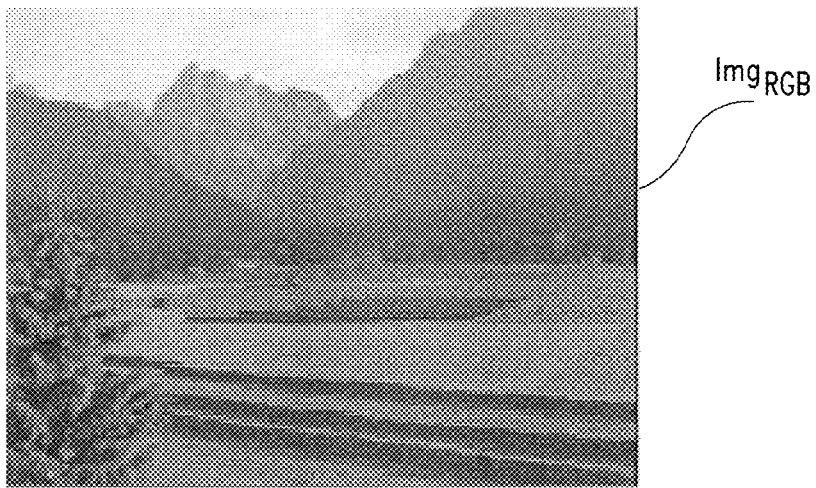
FIGS. 5A through 5C show an output image of the color reconstruction block and the corresponding output images of, respectively, the segmentation block and the block that divides the image into regions.
Figure 5B:
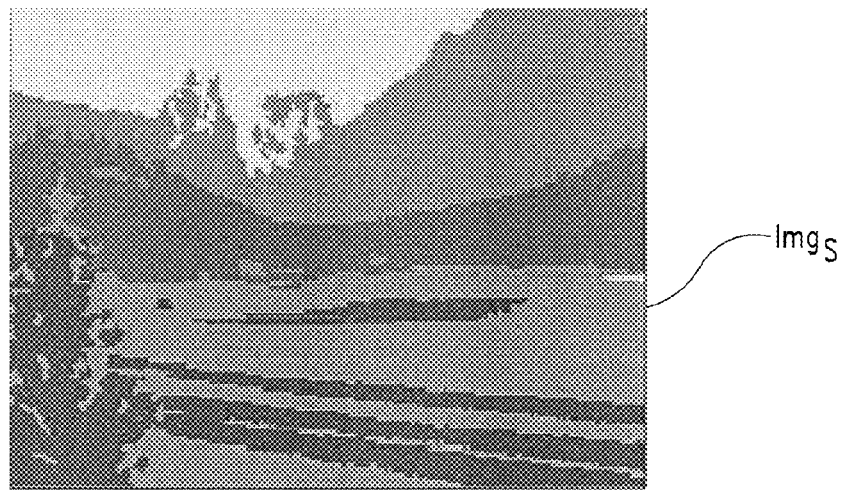
Figure 5C:
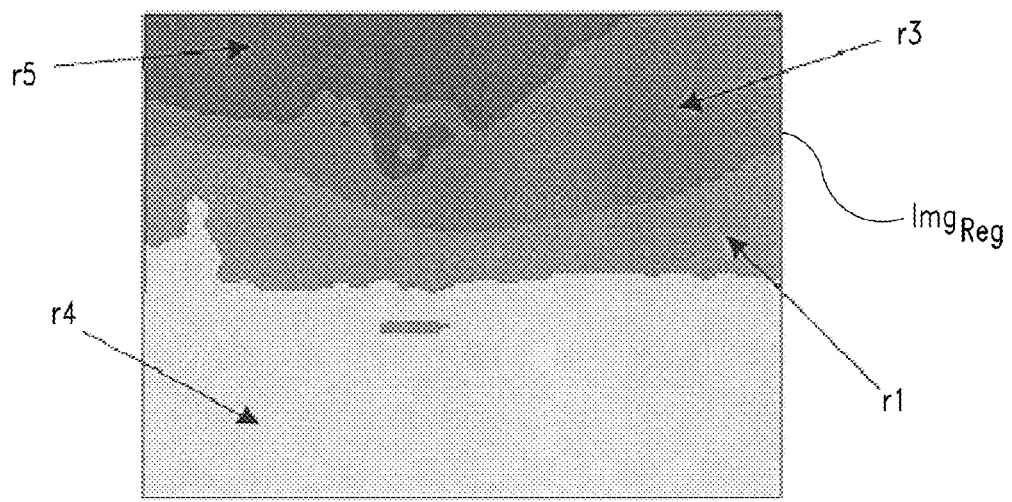

In FIGS. 5A through 5C the reference $Img_{RGB}$ indicates an output image of the color reconstruction block Col_Rec, while $Img_S$ and $Img_{Reg}$ indicate the corresponding output images of, respectively, the segmentation block Img_Seg and the block Reg_Detect that divides the image into regions. As may be noted, the image $Img_{Reg}$ is divided into four regions, respectively, from top to bottom: of the "Sky" type (r5), the "Farthest mountain type (r3), the "Near mountain" type (r1) and the "Land" type (r4).

Coming back to the block diagram of FIG. 1, a class decision block makes it possible to associate with the image $Img_{Reg}$ a class I_Class forming part of a predefined set of image classes $CL_1, CL_2, \ldots, CL_n$. In a particularly preferred embodiment the set of predefined classes includes the following classes: $CL_1$="outdoor with geometric appearance," $CL_2$="outdoor without geometric appearance (or panoramas)," $CL_3$="indoor" and similar.

It has been found that each class may be characterized by means of an appropriate simplified model obtained on the basis of a statistical observation of some characteristics typically present in images belonging to the class.

In a particularly preferred embodiment, a predefined Class $CL_1$ is characterized by a respective model comprising one or more predefined sequences (i.e. successions in accordance with a particular disposition) of regions that can be typically observed along a predetermined scanning direction in images belonging to this class. In particular, each predefined sequence includes a string of identifying labels (i.e. data) assigned to regions typically found along the predetermined scanning direction.

For example, considering the following table of labels identifying correspondences between regions and gray levels:

| REGION | LABEL | GRAY LEVEL |
|---|---|---|
| R5 = Sky | s | 0 |
| R3 = Farthest mountain | M | 50 |
| R2 = Distant mountain | M | 80 |
| R1 = Nearby mountain | M | 100 |
| R4 = Land | L | 200 |
| R6 = Other | X | 255 | it was found that the sequences of regions that could be observed with a certain statistical frequency in images belonging to the class $CL_1$="outdoor without geometric appearance (or panoramas)" are expressed by the following strings of identifying labels:

"S"
"sm"
"sl"
"sml"
"m"
"ml"
"l"
"sms"
"smsl"
"msl"
"mls"
"ls"

The label "s" placed after the labels "m" and/or "l" indicates situations in which a generic water surface is present in the lower part of the image.

It has also been found that the images belonging to the predefined class $CL_2$="outdoor with geometric appearance" present region sequences that do not belong to the set of sequences listed above, but nevertheless comprise a region of type s, i.e. "Sky," in the upper part.

Lastly, the remaining regions are characteristic of images belonging to the class $CL_3$="indoor."

Figure 6:
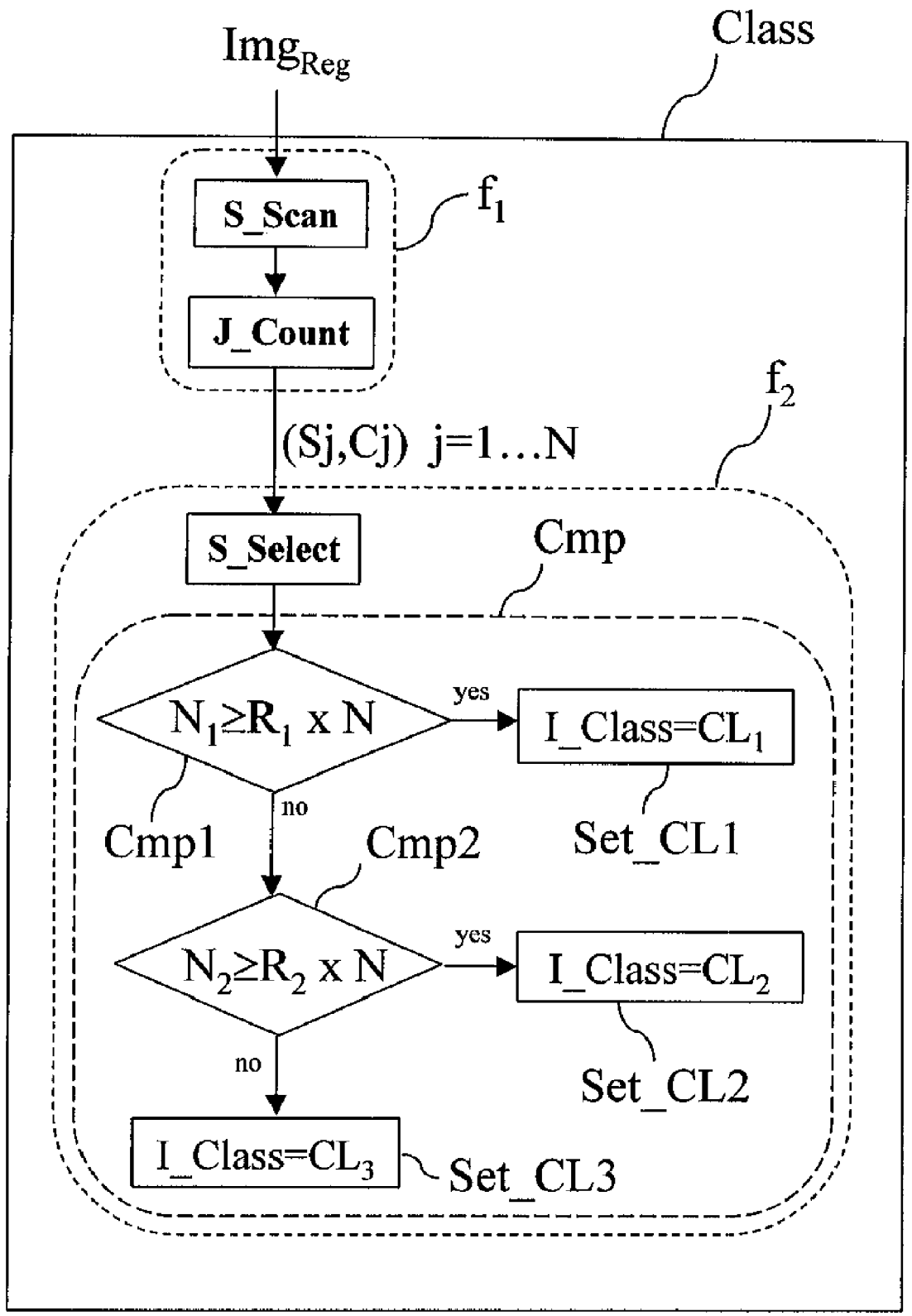
FIG. 6 shows the class decision block in greater detail by means of a flow chart.

Advantageously, in the class decision block, which is shown in greater detail in FIG. 6, there is carried out a phase $f_1$, for acquiring information from the image $Img_{Reg}$ divided into regions to obtain information about the regions present in it.

Preferably, the information acquired in this phase $f_1$ concerns: the number of transitions between regions and/or the type of regions present and/or the respective order of disposition in accordance with a predetermined scanning direction.

In an even more preferred embodiment, the information acquisition phase $f_1$ comprises an operation S_Scan of acquiring one or more sequences $S_j$ of regions from the image $Img_{Reg}$ divided into regions. This operation comprises, for example, one or more scannings of the image divided into regions along one or more predefined directions. In greater detail, during the scanning along a particular direction the identifying labels assigned to the regions encountered during the scanning are memorized in a string $S_j$ of characters.

Preferably, the scanning of the image is a scanning of the vertical type, from top to bottom for example, of the pixels belonging to one or more columns of the image. For example, the columns are selected at regular intervals starting from the top left-hand corner of the image. Hereinafter the present description will make reference to the scanning along the columns of the image without any limitation.

Preferably, the operation of acquiring the number N of acquired regions, i.e. the number N of columns subjected to scanning, is comprised between 5 and 10. In fact, it has been found that even though the acquisition of a large number N of sequences $S_j$ provides a larger quantity of information about the image that is to be classified, it does not always increase the probability of having a correct classification. In many cases, in fact, the experiments that envisaged the acquisition of a large number of sequences $S_j$ provided the same results as experiments carried out with a smaller number of acquired sequences.

Preferably, the gray levels associated with the pixels and the identifying labels encountered in the scanning direction are memorized during the scanning. For example, an identifying label is memorized in a string $S_j$ whenever it differs from the last identifying label memorized in the string $S_j$. Obviously, the label associated with the first region encountered is always memorized. Even more preferably, a label is memorized in the string $S_j$ whenever the number of pixels encountered during the scanning of a column exceeds a predetermined threshold value $H_{min}$ that corresponds to a minimum number of pixels chosen in manner proportional to the height H of the image. Preferably, the threshold value $H_{min}$ is substantially comprised between 5% and 15% of the vertical dimension H of the image. In a preferred embodiment, the information acquisition phase also comprises a counting operation J_Count along one or more predetermined directions of the number $C_j$ of transitions, i.e. passages (or jumps), between regions of different types of the image divided into regions.

For example, the counting phase is carried out directly during the scanning of a sequence $S_j$ of the image divided into regions by increasing a counter $C_j$ every time a transition between different regions is detected. In this case a corresponding counter $C_j$ can be associated with every string $S_j$, thus obtaining a data pair $(S_j, C_j)$ for every scanning of the image.

For example, a transition is detected during the scanning along a column of the image divided into regions whenever there is read a value (gray level) of a pixel different from the last previously read value.

It should be noted that, given a highly fragmented image divided into regions, even though the number of labels in the acquired strings $S_j$ may be limited on account of the control of the minimum number of pixels ($H_{min}$), the value of the corresponding transition counter $C_j$ may be high.

Figure 7:
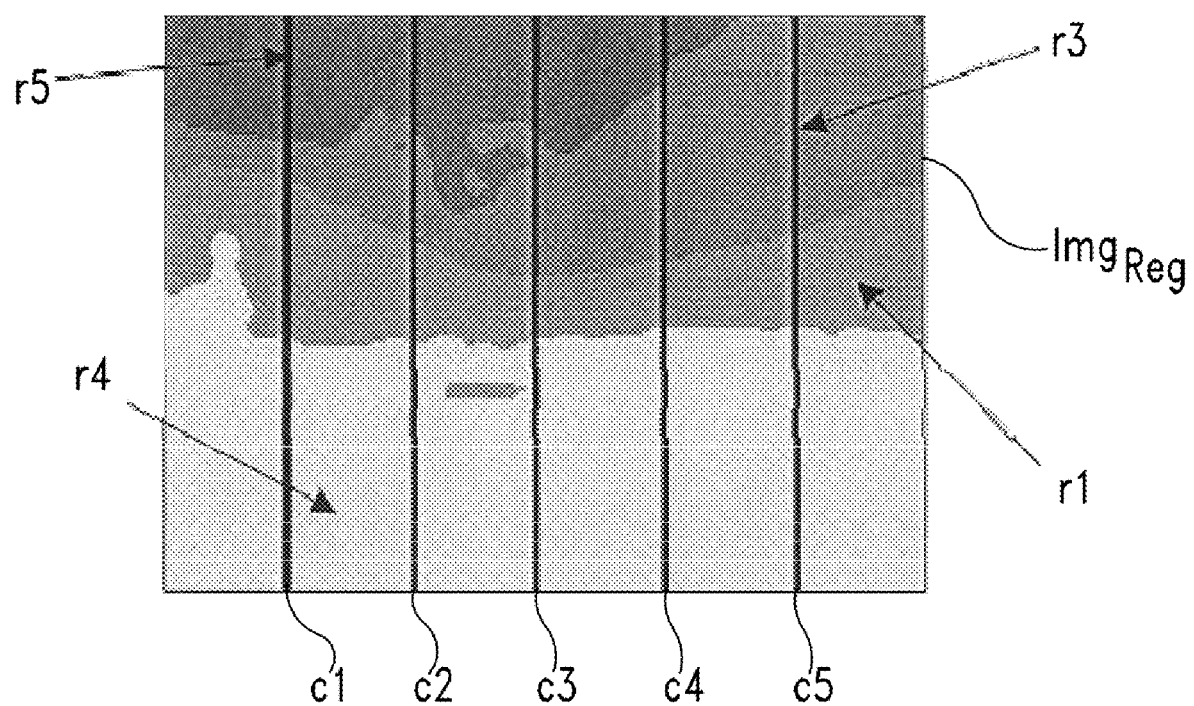
FIG. 7 shows the scanned columns in an image divided into regions in the information acquisition operation $f_1$ shown in the diagram of FIG. 6.

FIG. 7 shows the image divided into regions of FIG. 5 together with five columns c1, c2, c3 c4, c5 selected for scanning.

On the assumption that the columns c1, c2, c3 c4, c5 are scanned from top to bottom, the label strings $S_j$ read and the number and the transitions counted by the corresponding counters C are shown column by column in the following table:

| Column | String | Number of transitions |
| --- | --- | --- |
| Column c1 | $S_1$ = "sml" | $C_1$ = 3 |
| Column c2 | $S_2$ = "sml" | $C_2$ = 3 |
| Column c3 | $S_3$ = "sml" | $C_3$ = 3 |
| Column c4 | $S_4$ = "ml" | $C_4$ = 3 |
| Column c5 | $S_5$ = "ml" | $C_5$ = 2 |

Coming back to the block diagram of FIG. 6, in the class decision block there is also carried out an analysis phase $f_2$ of the information acquired in the acquisition phase $f_1$. The association of one of the predefined classes $CL_1$, $CL_2$, $CL_3$ with the image divided into regions is obtained on the basis of the result of this analysis phase $f_2$.

In particular, the analysis phase $f_2$ includes a phase Cmp of comparing the information $(S_j, C_j)$ obtained in the acquisition phase1 with the models that characterize the predefined classes.

The preferred embodiment in which information about the region sequences $S_j$ and the transition counters $C_j$ is acquired during the information detection phase $f_1$ also includes an operation S_Discard for selecting a subset of the N acquired sequences $S_j$ comprising sequences $S_j$ associated with a respective transition counter $C_j$ containing a value smaller than or, at the most, equal to a predetermined limit value $C_{th}$. Furthermore, the non-selected sequences are preferably discarded. For example, it has been found in the course of experimental tests that good results are obtained with a limit value $C_{th}$ approximately equal to ten.

The comparison operation Cmp is such as to verify whether the selected acquired sequences, i.e. the non-discarded sequences, are present among the predefined sequences of a model characterizing a predefined class.

Preferably, a predefined class $CL_1$, $CL_2$, $CL_3$ is associated with the image whenever among the predefined sequences of the model that characterizes the predefined class there is present a number of selected sequences greater than a predetermined percentage of the total number N of acquired sequences $S_j$.

In the example of FIG. 6 the comparison operation Cmp includes a first control operation Cmp1 in which there is determined the number N of the acquired and not discarded sequence $S_j$ that are comprised in the set of predefined sequences belonging to the model of the Class $CL_1$="outdoor without geometric appearance (or panoramas)." Whenever the determined number $N_1$ is greater than or equal to a predetermined percentage of the total number N of acquired sequences $S_j$, a first association operation Set $CL_1$ assigns the predefined class $CL_1$ to the image. In pseudo code, whenever:

$$N_1 \geq R_1 \times N$$

then $$I\_Class = CL_1$$

wherein $R_1$ is a number comprised between 0 and 1. The value of $R_1$ plays a fundamental part in associating the predefined class $CL_1$, because it furnishes a measure of the precision level of the entire method. It is obvious to note that low values of $R_1$ (smaller than 0.5, for example) make it possible to classify an image as belonging to the predefined class $CL_1$ with greater "ease." In these cases one therefore risks "taking for good" even images that in reality are not so.

On the other hand, utilizing a high value of R1 (greater than 0.8, for example) possibly risks an excessive thinning of the tolerance margin that has to be assured for a heuristic method.

From the acquired experience and the analyzed results it was found that values of $R_1$ substantially comprised between 0.6 and 0.8 make it possible to obtain sufficiently accurate and trustworthy results.

Whenever the number $N_1$ does not satisfy the above condition, a second control operation Cmp2 is carried out to determine the Number $N_2$ of the acquired and non-discarded sequences $S_j$ that are comprised in the set of predefined sequences belonging to the model of the class $CL_2$="outdoor with geometric appearance." When the determined number $N_2$ is greater than or equal to a predetermined percentage of the total number N acquired sequences $S_j$, a second association operation assigns the predefined Class $CL_2$ to the image. In pseudo code, when:

$$N_2 \geq R_2 \times N$$

then $$I\_Class = CL_2$$

wherein $R_2$ is a number comprised between 0 and 1.

Since in this case the predefined class includes sequences of regions that begin with the region "Sky," the tolerance margin determined by the parameter $R_2$ is very ample, and experimental results have shown that values of R2 substantially comprised between 0.1 and 0.5 make it possible to obtain sufficiently accurate and trustworthy results. In a particularly preferred embodiment, R2 is substantially equal to 02.

When the number $N_2$ does not satisfy the above condition, a third association operation Set_CL3 is carried out to assign to the image the predefined class $Cl_3$="indoor," which therefore contains all the sequences of regions not comprised in the models that characterize the predefined classes $CL_1$ and $CL_2$.

The proposed method has such advantages as automaticity, computational simplicity and efficiency.

Automaticity is a very important property of any image processing procedure. Indeed, the construction of a technique capable of providing reliable results by eliminating interaction with the human user represents a step forward in the global process of automation of the presently available technologies. Furthermore, it implies the possibility of aggregating image classification with other automatic processes for the purpose of creating advanced multi-process systems.

Simplicity and efficiency are two characteristics that do not always go hand in hand. In the method in question the problem of image classification is resolved by having recourse to a multi-stage system made up of a series of functional blocks that are relatively simple because they are implemented by means of algorithms based on rather elementary heuristic characterizations and statistical properties. Efficiency depends primarily on having used input images in CFA format and having made provision for color reconstruction with sub-sampling, thereby making it possible to work with images having dimensions equal to half the original ones, and having used the least number of possible operations (see, for example, the simplicity of the class decision block).

The method in accordance with the present invention may be directly utilized, for example, in such portable or fixed image acquisition devices as: digital photo/video cameras and the like, multimedia communication terminals capable of acquiring and/or receiving digital images. Furthermore, the method in accordance with the present invention can be executed as a program or a program portion in a processing device, a personal computer for example. This program can be memorized in any appropriate manner, for example in a memory or on such a memorization support as a floppy disk or a CD ROM.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

Obviously, with a view to satisfying contingent and specific needs, a person skilled in the art will be able to introduce numerous modifications and variants into the classification method described above, though all contained within the protection limits as defined by the claims attached hereto and the equivalents thereof.

The invention claimed is:

1. A method for associating with a digital image a class of a plurality of classes characterized by respective models, the method comprising the following phases in sequence:
    analyzing a digital image pixel by pixel to determine parameters of each pixel by verifying that each parameter satisfies at least one of pre-established conditions, logico-mathematical relationships, or both pre-established conditions and logico-mathematical relationships that are associated with respective predefined regions comprising sky, land, and mountain, and dividing the digital image pixel by pixel into a respective region belonging to a set of regions comprising sky, far mountain, near mountain, and land that are predefined and different from each other on the basis of their type of content based on the analysis, including assigning to each pixel a data item identifying the respective region to which the pixel belongs, said identifying data item comprising a digital value, that comprises a gray level, a set of digital values assigned to the pixels of the digital image in said assignment operation corresponding to a digital gray-level image divided into regions,
    acquiring from the digital image divided into regions information relating to the regions to be found in it,
    comparing the acquired information with at least one model characterizing a respective class of said plurality of classes,
    associating with the digital image a class of said plurality of classes on the basis of said comparison phase, and
    a phase of segmenting the digital image prior to the dividing phase, the digital output image of the segmentation phase divided into one or more areas that are chromatically substantially homogeneous and comprising a reduced range of colors as compared with the input image of the segmentation phase.

2. The method of claim 1, including prior to the division phase a phase of chromatic reconstruction that, starting from an input image in CFA format, provides an output image.

3. The method of claim 2, wherein the chromatic reconstruction phase comprises an operation of sub-sampling the digital image in CFA format in such a manner as to obtain a digital output image having a smaller resolution than the input image.

4. The method of claim 1, wherein the segmentation phase is substantially carried out in accordance with a "mean shift algorithm" technique.

5. The method of claim 1, wherein the segmentation phase employs a low segmentation resolution, the digital output image of the segmentation phase comprising a significantly reduced range of colors as compared with its digital input image and including predominant colors present in the input image.

6. The method of claim 1, wherein said pre-established conditions and logico-mathematical relationships are empirically derived from a statistical observation of images of real scenes.

7. The method of claim 1, wherein said pre-established conditions and logico-mathematical relationships comprise conditions for ascertaining whether parameters belong to intervals and comprise mathematical relationships between parameters.

8. The method of claim 1, wherein said parameters correspond to digital values representative of at least one of the following pixel components: red chromatic component, green chromatic component, blue chromatic component, hue, and intensity.

9. The method of claim 1, wherein said set of predefined regions includes "Farthest mountain."

10. The method of claim 1, wherein pixels belonging to regions that on the basis of their content are closer to an image observation point are associated respective gray levels that are darker than those associated with pixels belonging to more distant regions.

11. The method of claim 1, wherein the phase of dividing into regions comprises the following operations:
    application of a median filter to the digital image to obtain a filtered digital image;
    extraction of the digital values associated with RGB and HSI components of the filtered digital image;
    assignment to each pixel of the filtered digital image of a respective gray level for obtaining a provisional gray-level image divided into regions;
    application of a median filter to said provisional gray-level image for obtaining a final image divided into gray-level regions.

12. The method of claim 1, wherein said set of predefined classes comprises at least one of the following classes: "outdoor with geometric appearance," "outdoor without geometric appearance," and "Indoor."

13. The method of claim 1, wherein each predefined class is characterized by means of a suitable simplified model obtained on the basis of a statistical observation of some characteristics typically present in images belonging to the class.

14. The method of claim 1, wherein at least one predefined class is characterized by a respective model comprising one or more predefined sequences of regions typically detected along a predetermined scanning direction in images forming part of said predefined class.

15. The method of claim 14, wherein a predefined sequence includes a string of identifying labels assigned to regions typically detected along the predetermined scanning direction.

16. The method of claim 1, wherein the information acquired in the acquisition phase regards the number of regions or their type or the respective order in which they are arranged along a predetermined scanning direction.

17. The method of claim 1, wherein the information acquisition phase comprises an operation of acquiring one or more sequences of regions from the image divided into regions by means of an operation of scanning the image divided into regions along at least one predetermined scanning direction.

18. The method of claim 17, wherein a string of identifying label characters assigned to regions encountered during the scanning is memorized during said operation of scanning along the predetermined scanning direction.

19. The method of claim 17, wherein said scanning is a scanning of the vertical type of pixels belonging to one or more columns of the images divided into regions.

20. The method of claim 1, wherein said information acquisition phase includes an operation of counting the number of transitions between different regions along at least one predetermined direction of the image divided into regions.

21. The method of claim 14, wherein said comparison operation verifies whether one or more predefined sequences are present among the predefined sequences comprised in a model characterizing said predefined class.

22. The method of claim 21, wherein said predefined class is associated with the digital image when among the predefined sequences of the model characterizing said predefined class there is present a number of acquired sequences greater than a predetermined percentage of the total number of said acquired sequences.

23. A digital image acquisition device inclusive of a classification block for associating a class of a plurality of predefined classes with an acquired digital image, characterized in that said classification block operates on the basis of a method in accordance with claim 1.

24. A non-transitory computer readable medium whose contents contain a program or part of a computer program stored thereon that when executed configure the computer to associate with a digital image a class of a predefined plurality of classes in accordance with the following method:
    analyzing a digital image pixel by pixel to determine parameters of each pixel by verifying that each parameter satisfies at least one of pre-established conditions, logico-mathematical relationships, or both pre-established conditions and logico-mathematical relationships that are associated with respective predefined regions comprising sky, land, and mountain, and dividing the digital image pixel by pixel into a respective region belonging to a set of regions comprising sky, far mountain, near mountain, and land that are predefined and different from each other on the basis of their type of content based on the analysis, including assigning to each pixel a data item identifying the respective region to which the pixel belongs, said identifying data item comprising a digital value, that comprises a gray level, a set of digital values assigned to the pixels of the digital image in said assignment operation corresponding to a digital gray-level image divided into regions,
    acquiring from the digital image divided into regions information relating to the regions to be found in it,
    comparing the acquired information with at least one model characterizing a respective class of said plurality of classes,
    associating with the digital image a class of said plurality of classes on the basis of said comparison phase, and
    a phase of segmenting the digital image prior to the dividing phase, the digital output image of the segmentation phase divided into one or more areas that are chromatically substantially homogeneous and comprising a reduced range of colors as compared with the input image of the segmentation phase.

25. A method for classifying a digital image in a class from a plurality of classes, each class having a respective model associated therewith, the method comprising:

analyzing a digital image pixel by pixel to determine parameters of each pixel by verifying that each parameter satisfies at least one of pre-established conditions, logico-mathematical relationships, or both pre-established conditions and logico-mathematical relationships that are associated with respective predefined regions comprising sky, land, and mountain, and dividing the pixels into a respective region based on the analysis, including assigning to each pixel a data item identifying the respective region to which the pixel belongs, said identifying data item comprising a digital value, that comprises a gray level, a set of digital values assigned to the pixels of the digital image in said assignment operation corresponding to a digital gray-level image divided into regions;

acquiring from the digital image information relating to the regions found in the digital image;

comparing the acquired information with at least one model; and associating with the digital image a class on the basis of the comparison.

26. The method claim 25, comprising initially:

receiving an input image in CFA format and performing a chromatic reconstruction on the input image to provide an output image; and segmenting the output image by dividing the output image into one or more areas that are chromatically substantially homogeneous and that comprise a reduced range of colors as compared with the output image to form an output digital image.

27. The method of claim 26, wherein the chromatic reconstruction comprises subsampling the input image in CFA format in such a manner as to obtain a digital output image having a smaller resolution than the input image.

28. The method of claim 27, wherein the segmentation is substantially carried out in accordance with a mean shift algorithm technique that employs a low segmentation resolution in which a significantly reduced range of colors are present as compared with the input image and including predominant colors present in the input image.

29. A method for associating with a digital image a class of a plurality of classes characterized by respective models, the method comprising the following phases in sequence:

dividing the digital image pixel by pixel into a respective region belonging to a set of regions comprising sky, mountain, and land that are predefined and different from each other on the basis of their type of content, said division being effected by establishing whether or not a pixel of said image belongs to a respective region on the basis of an operation of analyzing the parameters of this pixel, the analysis operation being carried out by verifying that said parameters satisfy pre-established conditions or logico-mathematical relationships or both that belong to the respective region, including assigning to each pixel a data item identifying the respective region to which the pixel belongs, said identifying data item comprising a digital value, that comprises a gray level, a set of digital values assigned to the pixels of the digital image in said assignment operation corresponding to a digital gray-level image divided into regions, acquiring from the digital image divided into regions information relating to the regions to be found in it, comparing the acquired information with at least one model characterizing a respective class of said plurality of classes, associating with the digital image a class of said plurality of classes on the basis of said comparison phase, and at least one predefined class is characterized by a respective model comprising one or more predefined sequences of regions detected along a predetermined scanning direction in images forming part of said predefined class.

30. The method of claim 29, wherein a predefined sequence includes a string of identifying labels assigned to regions typically detected along the predetermined scanning direction.

* * * * *

UNITED STATES PATENT AND TRADEMARK OFFICE
CERTIFICATE OF CORRECTION

Page 1 of 1

PATENT NO.        : 7,929,756 B2
APPLICATION NO.   : 12/479596
DATED             : April 19, 2011
INVENTOR(S)       : Salvatore Curti et al.

It is certified that error appears in the above-identified patent and that said Letters Patent is hereby corrected as shown below:

Title Page Item 30
"Jul. 15, 2004 (IT)....MI03A0014" should read as, --Jul. 15, 2003 (IT)....MI03A1449--.

Column 17
Claim 26, Line 22, "26. The method claim 25, comprising initially:" should read as,
--26. The method of claim 25, comprising initially:--.

Signed and Sealed this
Seventeenth Day of April, 2012

David J. Kappos
*Director of the United States Patent and Trademark Office*